(12) United States Patent
Kang

(10) Patent No.: US 8,340,290 B2
(45) Date of Patent: Dec. 25, 2012

(54) SECURITY METHOD OF KEYBOARD INPUT DIRECTLY CONTROLLING THE KEYBOARD CONTROLLER

(75) Inventor: Hong Seok Kang, Seoul (KR)

(73) Assignee: Softcamp Co., Ltd., Seoul (KR)

( * ) Notice: Subject to any disclaimer, the term of this patent is extended or adjusted under 35 U.S.C. 154(b) by 285 days.

(21) Appl. No.: 12/681,522

(22) PCT Filed: Oct. 2, 2008

(86) PCT No.: PCT/KR2008/005809
§ 371 (c)(1), (2), (4) Date: Apr. 2, 2010

(87) PCT Pub. No.: WO2009/045059
PCT Pub. Date: Apr. 9, 2009

(65) Prior Publication Data
US 2010/0228994 A1      Sep. 9, 2010

(30) Foreign Application Priority Data

Oct. 2, 2007 (KR) .................. 10-2007-0099234

(51) Int. Cl.
*H04L 17/02* (2006.01)

(52) U.S. Cl. .......................... 380/52; 380/42

(58) Field of Classification Search .............. 380/42, 380/52
See application file for complete search history.

(56) References Cited

U.S. PATENT DOCUMENTS

| | | | | |
|---|---|---|---|---|
| 5,802,318 A | * | 9/1998 | Murray et al. | 710/100 |
| 6,070,204 A | * | 5/2000 | Poisner | 710/100 |
| 6,912,663 B1 | * | 6/2005 | Dayan et al. | 726/16 |
| 2004/0230805 A1 | | 11/2004 | Peinado et al. | |
| 2007/0143593 A1 | * | 6/2007 | Cardoso | 713/150 |

FOREIGN PATENT DOCUMENTS

| KR | 10-2004-0072044 | 8/2004 |
|---|---|---|
| KR | 10-0549645 | 2/2006 |
| KR | 10-2007-0074897 | 7/2007 |

OTHER PUBLICATIONS

Daniel Treat, "Keyboard Encryption", Aug. 2002, IEEE, pp. 40-42.*

* cited by examiner

*Primary Examiner* — Matthew Smithers
(74) *Attorney, Agent, or Firm* — IPLA P.A.; James E. Bame

(57) ABSTRACT

Disclosed herein is a method of securing keyboard input information by directly controlling a keyboard controller of a keyboard. The keyboard includes the keyboard controller, an interrupt controller, an input information processing module and a keyboard security module. The method includes a status information checking step of enabling the input information processing module to check status information of the keyboard controller; an interrupt inactivation step of inactivating an interrupt request function of the keyboard controller; an input information encryption step of encrypting the keyboard input information written to the keyboard input/output ports; a transfer step of transferring the encrypted input information to the keyboard security module; and an input information deletion step of deleting the keyboard input information remaining in the keyboard controller.

4 Claims, 5 Drawing Sheets generation of electric signal

Figure 5

- 0x20 (Read Command Byte) - Returns command byte. (See "Write Command Byte" below).
- 0x60 (Write Command Byte) - Stores parameter as command byte.
- 0x90-0x9F (Write to output port) - Writes command's lower nibble to lower nibble of output port (see Output Port definition.)
- 0xA1 (Get version number) - Returns firmware version number.
- 0xA4 (Get password) - Returns 0xFA if password exists; otherwise, 0xF1.
- 0xA5 (Set password) - Set the new password by sending a null-terminated string of scan codes as this command's parameter.
- 0xA6 (Check password) - Compares keyboard input with current password.
- 0xA7 (Disable mouse interface) - PS/2 mode only. Similar to "Disable keyboard interface" (0xAD) command.
- 0xA8 (Enable mouse interface) - PS/2 mode only. Similar to "Enable keyboard interface" (0xAE) command.
- 0xA9 (Mouse interface test) - Returns 0x00 if okay, 0x01 if Clock line stuck low, 0x02 if clock line stuck high, 0x03 if data line stuck low, and 0x04 if data line stuck high.
- 0xAA (Controller self-test) - Returns 0x55 if okay.
- 0xAB (Keyboard interface test) - Returns 0x00 if okay, 0x01 if Clock line stuck low, 0x02 if clock line stuck high, 0x03 if data line stuck low, and 0x04 if data line stuck high.
- 0xAD (Disable keyboard interface) - Sets bit 4 of command byte and disables all communication with keyboard.
- 0xAE (Enable keyboard interface) - Clears bit 4 of command byte and re-enables communication with keyboard.
- 0xAF (Get version)
- 0xC0 (Read input port) - Returns values on input port (see Input Port definition.)
- 0xC1 (Copy input port LSn) - PS/2 mode only. Copy input port's low nibble to Status register (see Input Port definition)
- 0xC2 (Copy input port MSn) - PS/2 mode only. Copy input port's high nibble to Status register (see Input Port definition.)
- 0xD0 (Read output port) - Returns values on output port (see Output Port definition.)
- 0xD1 (Write output port) - Write parameter to output port (see Output Port definition.)
- 0xD2 (Write keyboard buffer) - Parameter written to input buffer as if received from keyboard.
- 0xD3 (Write mouse buffer) - Parameter written to input buffer as if received from mouse.
- 0xD4 (Write mouse Device) - Sends parameter to the auxiliary PS/2 device.
- 0xE0 (Read test port) - Returns values on test port (see Test Port definition.)
- 0xF0-0xFF (Pulse output port) - Pulses command's lower nibble onto lower nibble of output port (see Output Port definition.)

Figure 6

|  | MSb | | | | | | LSb |
|---|---|---|---|---|---|---|---|
| AT-compatible mode: | -- | XLAT | PC | _EN | OVR | SYS | -- | INT |
| PS/2-compatible mode: | -- | XLAT | _EN2 | _EN | -- | SYS | INT2 | INT |

- INT (Input Buffer Full Interrupt) - When set, IRQ 1 is generated when data is available in the input buffer.
  0: IBF Interrupt Disabled - You must poll STATUS<IBF> to read input.
  1: IBF Interrupt Enabled - Keyboard driver at software int 0x09 handles input.
- SYS (System Flag) - Used to manually set/clear SYS flag in Status register.
  0: Power-on value - Tells POST to perform power-on tests/initialization.
  1: BAT code received - Tells POST to perform "warm boot" tests/initailization.
- OVR (Inhibit Override) - Overrides keyboard's "inhibit" switch on older motherboards.
  0: Inhibit switch enabled - Keyboard inhibited if pin P17 is high.
  1: Inhibit switch disabled - Keyboard not inhibited even if P17 = high.
- _EN (Disable keyboard) - Disables/enables keyboard interface.
  0: Enable - Keyboard interface enabled.
  1: Disable - All keyboard communication is disabled.
- PC ("PC Mode") - Enables keyboard interface somehow
  0: Disable
  1: Enable
- XLAT (Translate Scan Codes) - Enables/disables translation to set 1 scan codes.
  0: Translation disabled - Data appears at input buffer exactly as read from keyboard
  1: Translation enabled - Scan codes translated to set 1 before put in input buffer
- INT2 (Mouse Input Buffer Full Interrupt) - When set, IRQ 12 is generated when mouse data is available.
  0: Auxillary IBF Interrupt Disabled -
  1: Auxillary IBF Interrupt Enabled -
- _EN2 (Disable Mouse) - Disables/enables mouse interface.
  0: Enable - Auxillary PS/2 device interface enabled
  1: Disable - Auxillary PS/2 device interface disabled

SECURITY METHOD OF KEYBOARD INPUT DIRECTLY CONTROLLING THE KEYBOARD CONTROLLER

TECHNICAL FIELD

The present invention relates generally to a method of securing keyboard input information which is capable of preventing information input via the keyboard from being exposed to unauthorized parties by directly controlling the interrupt of an 8042 keyboard controller in a PS/2 keyboard.

BACKGROUND ART

When a key of a keyboard is pressed in keyboard hardware (a key press event), an electric signal is generated and then transferred to an 8042 chipset disposed in a motherboard. Here, the keys of the keyboard are all disposed on a matrix in the form of an electric circuit. When a key is pressed, it can be found which key has been pressed by searching for row and column lines on which a change in electric current has occurred (refer to FIG. 1).

An 8042 keyboard controller for controlling the 8042 chipset records keyboard input information in the form of keyboard scan code in bi-directional keyboard input/output (I/O) ports 60h and 64h which are used to transfer the keyboard input information to a CPU or to receive hardware control commands from the CPU, and generates an interrupt which is directed to the CPU (refer to FIG. 2).

The bi-directional keyboard I/O ports include the ports 60h and 64h. The port 60h processes actual keyboard input information and hardware control commands, and the port 64h is used to issue status and commands with respect to the port 64h.

Table 1 shows the classification of the functions of the keyboard I/O ports.

TABLE 1

|     | IN Buffer | OUT Buffer |
| --- | --- | --- |
| 60h | transmission of hardware control command from 'CPU -> keyboard I/O ports' | transmission of keyboard input information from 'keyboard I/O ports -> CPU' |
| 64h |  | display of status of port 60h |

The keyboard scan code includes Make Code that is generated at the moment a key is pressed and Break Code that is generated at the moment a key is released. If a key is pressed and held down, characters are consecutively output on a screen. That is, while a certain key is held down, Make Codes are consecutively output. At the moment the key is released, one Break Code is output, thereby terminating a key repeat process.

An interrupt refers to a method of, during a certain process, temporarily stopping the process and then calling the attention of the CPU in order to prompt the CPU to perform its task. The 8042 keyboard controller having received an electric signal that has been generated by the physical keyboard input requests the generation of an interrupt from an 8259 interrupt controller for controlling the 8259 chipset. The 8259 interrupt controller informs the CPU that the corresponding interrupt has been generated (an interrupt request), and the CPU, in order to call a corresponding interrupt handling function (an interrupt handler), reads an interrupt vector table that is loaded in memory and then obtains an address value (a memory address) corresponding to the generated interrupt. This address value indicates the value of an address at which a function (a so-called 'interrupt handling function' or 'interrupt handler') that is called when an interrupt is generated is stored. When a hardware device requests the CPU to process a specific operation or task, movement to the location of the address is made and then the interrupt handling function is executed.

As described above, the keyboard input information is transferred from a kernel area to the CPU and an application (a user area) that are controlled by an Operating System (OS), and are then output and processed as desired by a user.

Meanwhile, the input information may include information requiring security such as personal information. Such input information is targeted for hacking for the purpose of being used criminally. In reality, input information has in fact been targeted for hacking and has been exposed to third parties without users' authorization. Therefore, there have been situations where a security system for protecting input information during the process of inputting that information through a keyboard has been urgently requested.

In response to this request, various types of security systems have been provided so far.

A conventional keyboard security system performs different operations in the user area and the kernel area, respectively. In the kernel area, the conventional keyboard security system first fetches keyboard input information and performs security processing thereon. In contrast, in the user area, the conventional keyboard security system performs security processing on the keyboard input information fetched from the kernel area and finally outputs the resulting information.

Conventional security methods that are performed in the kernel area include a method of changing the Interrupt Descriptor Table (IDT) address of an interrupt function, or a method of enabling input information to be processed using a jump code, prior to being processed by an intrusion system.

However, since the conventional security method that operates in the kernel area is an OS-based method, the method of application must vary with the OS. Furthermore, in the case where the same security methods are used, there arises a problem in that the priorities for the processing of keyboard input information conflict with each other. Moreover, since an intrusion system that directly attacks a keyboard controller (hardware) cannot be deterred, there is a problem in that complete security for keyboard input information cannot be guaranteed.

DISCLOSURE

Technical Problem

Accordingly, the present invention has been made to solve the above problems, and an object of the present invention is to provide a method of securing keyboard input information by directly controlling a keyboard controller, which can, regardless of the type of and compatibility with an OS for supervising the general operations of a computer, independently secure and process information that is input through a keyboard, prior to being processed by intrusion systems, thereby providing enhanced security performance.

Technical Solution

In order to accomplish the above object, the present invention provides a method of securing keyboard input information by directly controlling a keyboard controller of a keyboard, the keyboard including the keyboard controller for receiving the keyboard input information input by a user and writing the keyboard input information to keyboard I/O ports, an interrupt controller for receiving an interrupt request from the keyboard controller and calling an interrupt handling function, an input information processing module for controlling the keyboard controller, and a keyboard security module for transferring the keyboard input information sent from the input information processing module to a central processing unit, the method including:

a status information checking step of enabling the input information processing module to check status information of the keyboard controller;

an interrupt inactivation step of inactivating an interrupt request function of the keyboard controller;

an input information encryption step of encrypting the keyboard input information written to the keyboard input/output ports;

a transfer step of transferring the encrypted input information to the keyboard security module; and an input information deletion step of deleting the keyboard input information remaining in the keyboard controller.

Advantageous Effects

According to the above-described present invention, input keyboard input information can be encrypted and then separately processed through the manipulation of a PS/2 keyboard before the CPU pays attention thereto, so that there are advantages in that the present invention can be applied without the limitation of observing the processing procedure of an OS and in that strong security performance can be provided because security processing is performed first in the process of processing the keyboard input information.

DESCRIPTION OF DRAWINGS

FIG. 5 shows a specification of control commands for an 8042 keyboard controller; and FIG. 6 shows a specification of status information for the 8042 keyboard controller.

MODE FOR INVENTION

Hereinafter, the present invention will be described in detail with reference to the attached exemplary drawings.

Figure 1:
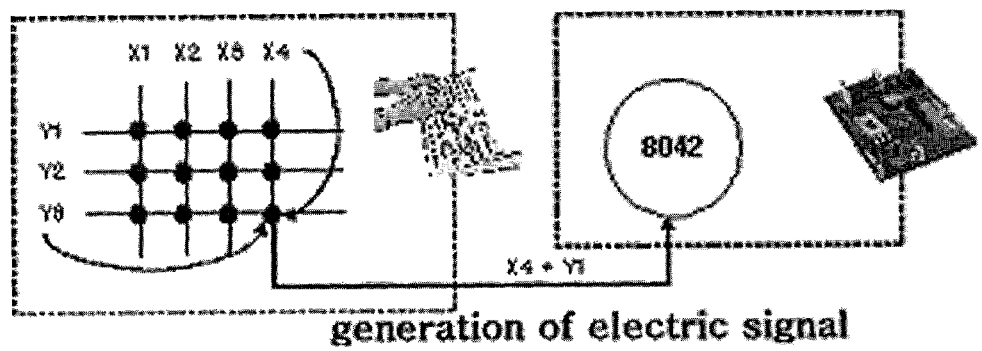
FIG. 1 is a diagram schematically showing a process of generating an electric signal in keyboard hardware.
Figure 2:
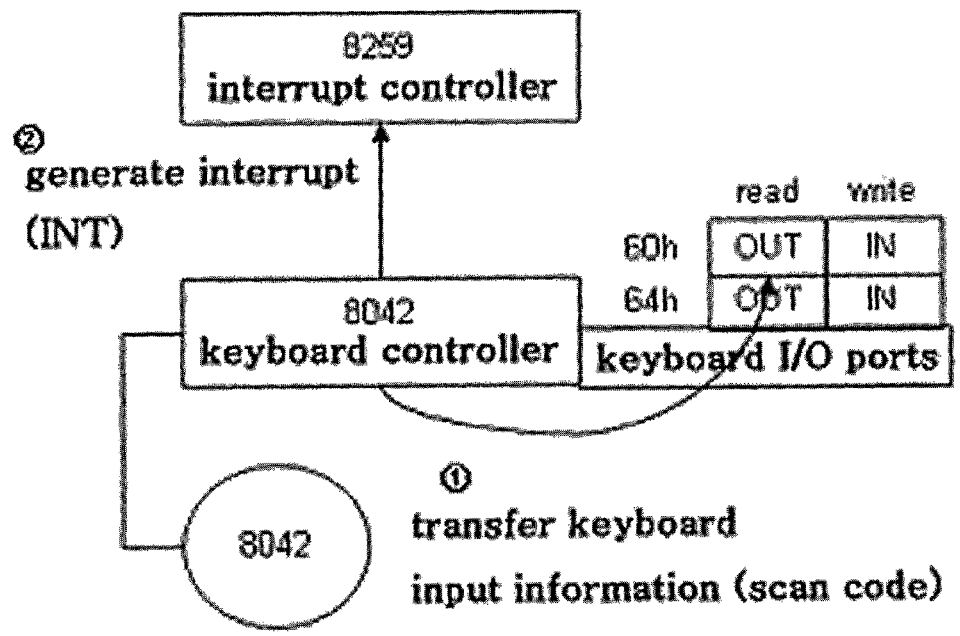
FIG. 2 is a diagram schematically showing the operational principle of a PS/2-dedicated keyboard controller.
Figure 3:
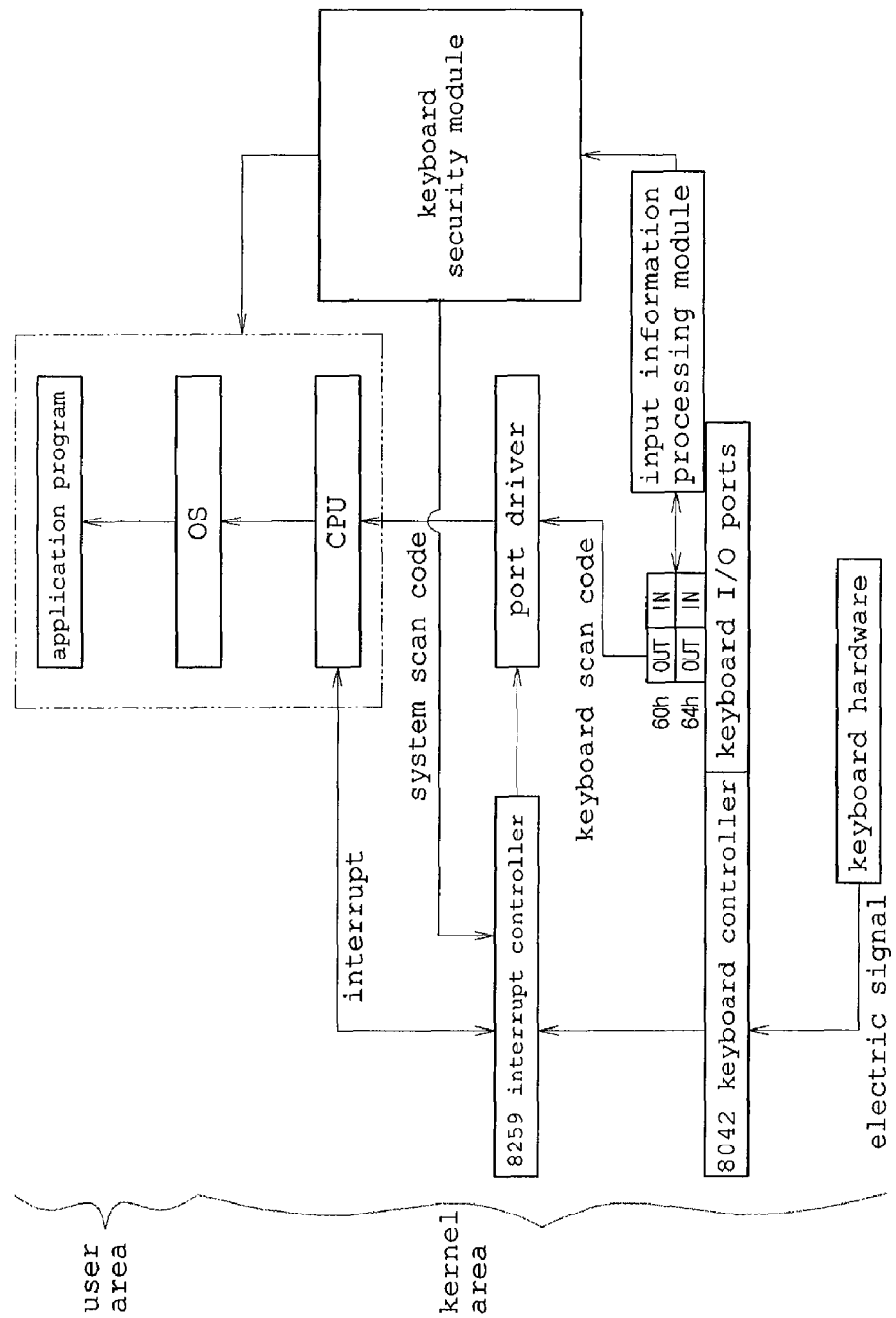
FIG. 3 is a block diagram showing the configuration of a system that forms a basis for performing a method of securing keyboard input information according to the present invention.
Figure 4:
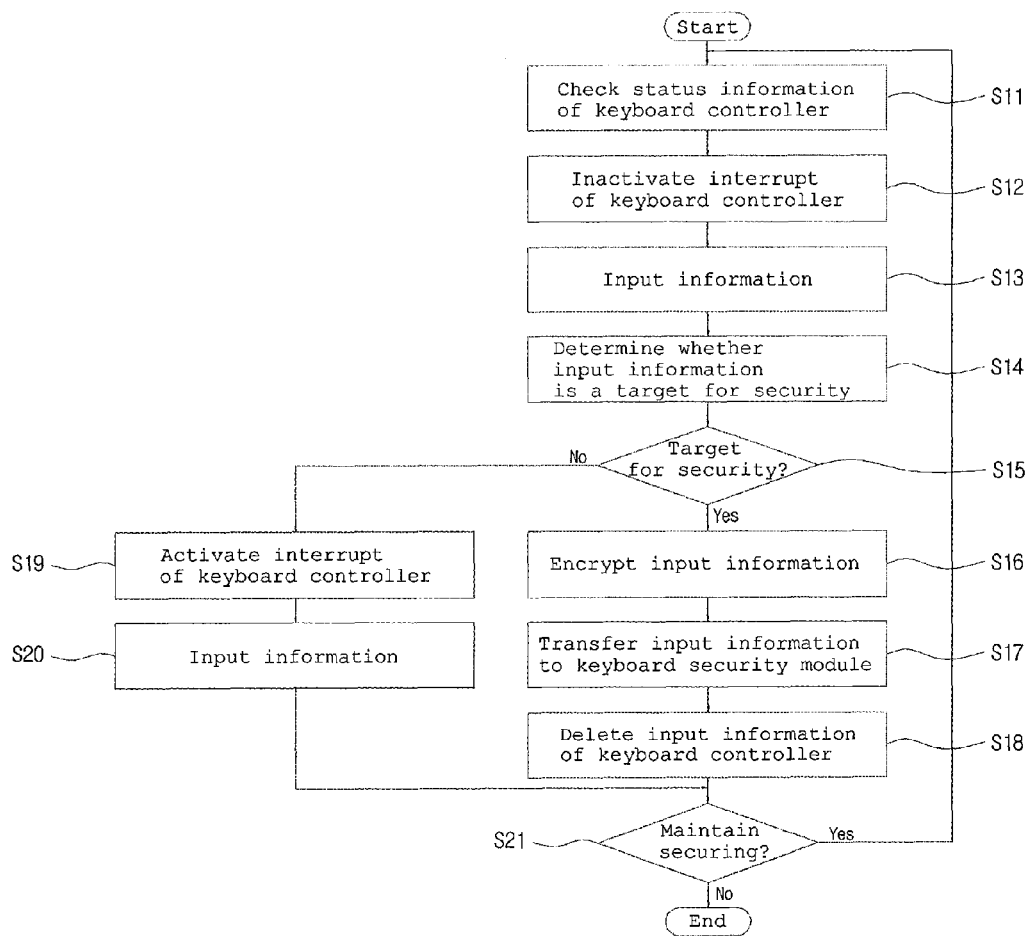
FIG. 4 is a flowchart sequentially showing the method of securing keyboard input information according to the present invention.

FIG. 3 is a block diagram showing the configuration of a system that forms a basis for performing a method of securing keyboard input information according to the present invention, and FIG. 4 is a flowchart sequentially showing the method of securing keyboard input information according to the present invention. With reference to these drawings, the following description will be given below.

The method of securing keyboard input information by directly controlling a keyboard controller according to the present invention is configured to protect input information that has been input through a PS/2 keyboard and perform a security task independently of the influence of an OS. Accordingly, the method of securing keyboard input information according to the present invention, before the CPU recognizes the input information input through the PS/2 keyboard and performs an operation, transfers the input information to a keyboard security module according to the present invention, thereby enabling strong security to be achieved for the input information.

For this purpose, a security system according to the present invention includes an input information processing module for controlling the interrupt request function of an 8042 keyboard controller and checking and encrypting the keyboard input information, and a keyboard security module for performing the intermediation of processing by transferring the encrypted input information to a user area.

The present invention is performed through the following steps.

S11: Step of Checking Status Information of Keyboard Controller

The security system according to the present invention includes the input information processing module for controlling the 8259 interrupt controller that checks input information, that is, an electric signal that is received by the 8042 keyboard controller, and then generates an interrupt and checking and encrypting the input information, and a keyboard security module for performing the intermediation of processing by transferring the encrypted input information to a user area.

The input information processing module continuously checks status information by polling port 64$h$ (checking it at regular intervals), and, in the case of a keyboard input, fetches corresponding keyboard input information by reading the port 60$h$.

The checking step S11 is used to change only a part corresponding to the corresponding keyboard input information, that is, a desired part, without changing existing status information.

The status information may be fetched by issuing a control command to the port 64$h$.

The following description will be given with reference to FIG. 5 (a specification of control commands for the 8042 keyboard controller). When a control command 0x20 (read command byte) is written to the port 64$h$, current status information enters into the port 60$h$, and the input information processing module reads the port 60$h$ and then fetches the current status information of the 8042 keyboard controller.

FIG. 6 shows a specification of status information for the 8042 keyboard controller. The input information processing module may identify the status information, shown in FIG. 6, at the port 60$h$.

S12: Step of Inactivating Interrupt of Keyboard Controller

As described above, when a user manipulates the keyboard, an electric signal is generated by the keyboard, and the 8042 keyboard controller (the 8042 chipset) receives the electric signal.

Meanwhile, the electric signal of the 8042 keyboard controller is transferred to keyboard input/output (I/O) ports in the form of a keyboard scan code, and the 8259 interrupt controller generates an interrupt in the keyboard I/O ports so as to process the keyboard scan code, so that the CPU can pay attention thereto.

Accordingly, the security method according to the present invention inactivates an interrupt request function so as to prevent the 8042 keyboard controller from requesting the 8259 interrupt controller to generate an interrupt.

The inactivating of the interrupt request function of the 8042 keyboard controller is accomplished by changing the status information, shown in FIG. 5 (the specification of status information for the 8042 keyboard controller), using a control command.

As can be seen from FIG. 6, since the interrupt information of the keyboard controller is INT, a keyboard interrupt is turned off when the value of INT is set to 0 as described below, thereby inactivating the interrupt request function of the 8042 keyboard controller.

① A control command 0x60 (a write command byte) is written to the port 64*h*.

② INT is set to 0 and then written to the port 60*h*.

S13: Step of Inputting Information

A user inputs specific information by manipulating the PS/2 keyboard. That is, a user generates an electric signal through the manipulation of the keyboard hardware, and keyboard scan code-type input information corresponding to the electric signal is input to the keyboard I/O ports through the 8042 keyboard controller, as described above. Meanwhile, due to the inactivation of the interrupt function of the 8042 keyboard controller, an interrupt is not generated, so that the CPU does not pay attention thereto.

S14: Step of Determining Whether Input Information is Target for Security (S15)

Whether the corresponding input information is a target for security is determined.

The types and amount of information that is input by a user through the manipulation of the keyboard are various and large. Accordingly, input information that is a target for security should be identified from the above-described input information.

As a simple example, in the case where keys capable of inputting text such as 'a', 'b' and 'c' are set as security targets and special keys such as 'Ctrl' and 'Alt' keys are set as non-security targets, when the key for 'a' that is a security target is pressed, input is encrypted and then transferred to a keyboard security module. In contrast, when the key 'Ctrl' that is not a target for security is pressed, input is not encrypted, but is subjected to the original keyboard input information processing procedure.

Since the criteria for determining whether information under consideration is the target for security may be modified and practiced in various manners, the security method according to the present invention is not limited to specific criteria, but the criteria may be modified and practiced in various manners within a range that does not depart from the scope of the appended claims.

S16: Step of Encrypting Input Information

If, as a result of the determination of whether the input information is the target for security, the corresponding input information is determined to be the target for security, the input information processing module encrypts the input information.

Since various encryption methods may be used, the method of encrypting the input information is not limited to a specific encryption method.

S17: Step of Transferring Encrypted Information to Keyboard Security Module

The encrypted input information is transferred to the keyboard security module using the function DeviceioControl.

S18: Step of Deleting Input Information of Keyboard Controller

When the encrypted keyboard input information is transferred to the keyboard security module, the input information processing module deletes the keyboard input information existing in the 8042 keyboard controller. The deletion of the input information is performed by writing a control command 0xd2 (write keyboard buffer) to the port 64*h* and writing 0x00 to the port 60*h*.

S19: Step of Activating Interrupt of Keyboard Controller

If the keyboard input information is determined not to be a target for security at step S14 (the step of determining whether the input information is the target for security), the interrupt request function is activated again in order for the processing of the corresponding input information to be subjected to the original keyboard input information processing procedure.

In order to activate the interrupt request function, the input information processing module writes a control command 0x60 (write command byte) to the port 64*h*, and writes the value of INT to the port 60*h* with INT set to 1.

S20: Step of Inputting Information

In order to enable the original keyboard input information procedure to be normally performed, the input information processing module inputs keyboard input information to the keyboard controller again.

The input information processing module writes a control command 0xd2 (write keyboard buffer) to the port 64*h* and writes the keyboard input information to the port 64*h*, thereby inputting the keyboard input information again.

The keyboard input information which is input as described above and is not a target for security is transferred to the keyboard I/O ports and then transferred to the CPU through a port driver, so that the CPU pays attention thereto due to the activated interrupt.

S21: Step of Determining Whether to Continue Applying Security

Whether to continue applying security based on the security system according to the present invention is determined. If the application of security is determined to be continued, step S11 of checking the status information of the keyboard controller and step S12 of inactivating the interrupt of the keyboard controller are repeated. In contrast, if the application of security is determined not to be continued, the interrupt activated status is maintained.

The inactivation of the interrupt request function is achieved by writing the control command 0x00 (write command byte) to the port 64*h* and writing the value of INT to the port 60*h* with INT set to 0, as described above.

Furthermore, the activation of the interrupt request function is achieved by writing the control command 0x60 (write command byte) to the port 64*h* and writing the value of INT to the port 60*h* with INT set to 1, as described above.

The invention claimed is:

1. A method of securing keyboard input information by directly controlling a keyboard controller of a keyboard, the keyboard including the keyboard controller for receiving the keyboard input information input by a user and writing the keyboard input information to keyboard input/output (I/O) ports, an interrupt controller for receiving an interrupt request from the keyboard controller and calling an interrupt handling function, an input information processing module for controlling the keyboard controller, and a keyboard security module for transferring the keyboard input information sent from the input information processing module to a central processing unit, the method comprising:

a status information checking step of enabling the input information processing module to check status information of the keyboard controller;

an interrupt inactivation step of inactivating an interrupt request function of the keyboard controller;

a setting step of making settings so that the input information processing module determines whether the keyboard input information written to the keyboard I/O ports is a target for security, the keyboard input information encrypts the keyboard input information written to the keyboard I/O ports and then transfers the encrypted keyboard input information to the keyboard security module if the keyboard input information is determined to be a target for security, and the keyboard controller requests an interrupt if the keyboard input information is determined not to be a target for security;

an input information deletion step of, if the input information processing module determines the keyboard input information to be a target for security, deleting the keyboard input information remaining in the keyboard controller; and an input information re-input step of, if the input information processing module determines the keyboard input information not to be a target for security, inputting the keyboard input information written to the keyboard I/O ports to the keyboard controller again.

2. The method according to claim 1, wherein the input information deletion step is performed in such a way that the input information processing module writes a control command 0xd2 (write keyboard buffer) to port 64*h* and 0x00 to port 60*h*.

3. The method according to claim 1, wherein:

the status information checking step is performed by inputting current status information to the port 60*h* of the keyboard I/O ports in such a way that the input information processing module writes a control command 0x20 (a read command byte) to the port 64*h* of the keyboard I/O ports, and by fetching the current status information of the keyboard controller in such a way that the input information processing module reads the port 60*h*; and the interrupt inactivation step is performed by writing a control command 0x60 (a write command byte) to the port 64*h* and a value of INT to the port 60*h*, with INT set to 0, through the input information processing module.

4. The method according to claim 1, wherein:

the setting in which the keyboard controller requests an interrupt is executed by writing a control command 0x60 (a write command byte) to port 64*h* and INT to port 60*h*, with INT set to 1, through the input information processing module; and the information input step is performed by writing a control command 0xd2 (write keyboard buffer) to the port 64*h* and the keyboard input information to the port 60*h*.

* * * * *